(12) United States Patent
Favaretto

(10) Patent No.: US 9,188,060 B2
(45) Date of Patent: Nov. 17, 2015

(54) "V" CONFIGURATION ENGINE CYLINDERS AND CRANK WITH ANTIPHASE FIRST ORDER RECIPROCATING INERTIAL FORCES

(71) Applicant: Ferrari S.p.A., Modena (IT)

(72) Inventor: Fabrizio Favaretto, Formigine (IT)

(73) Assignee: Ferrari S.p.A. (IT)

( * ) Notice: Subject to any disclaimer, the term of this patent is extended or adjusted under 35 U.S.C. 154(b) by 51 days.

(21) Appl. No.: 13/929,270

(22) Filed: Jun. 27, 2013

(65) Prior Publication Data

US 2014/0000547 A1    Jan. 2, 2014

(30) Foreign Application Priority Data

Jun. 28, 2012   (IT) .............................. BO2012A0359

(51) Int. Cl.
| | |
|---|---|
| F02B 75/06 | (2006.01) |
| F02B 75/22 | (2006.01) |
| F02B 77/00 | (2006.01) |
| F02B 61/02 | (2006.01) |
| F16F 15/28 | (2006.01) |
| F16C 3/20 | (2006.01) |

(52) U.S. Cl.
CPC ................ F02B 77/00 (2013.01); F02B 61/02 (2013.01); F02B 75/22 (2013.01); F16C 3/20 (2013.01); F16F 15/283 (2013.01)

(58) Field of Classification Search
CPC ....................................................... F02B 77/00
USPC .......................... 123/54.4, 192.2; 74/603, 604
See application file for complete search history.

(56) References Cited

U.S. PATENT DOCUMENTS

| | | | | | |
|---|---|---|---|---|---|
| 4,496,020 | A | * | 1/1985 | Mitsuishi ....................... | 180/219 |
| 4,517,933 | A | * | 5/1985 | Yasutake ....................... | 123/54.4 |
| 4,617,885 | A | * | 10/1986 | Oshiro et al. ............... | 123/192.2 |
| 4,765,138 | A | * | 8/1988 | Corey ............................. | 60/517 |

FOREIGN PATENT DOCUMENTS

| | | |
|---|---|---|
| DE | 1776154 A1 | 1/1972 |
| GB | 1285915 A | 8/1972 |
| JP | 53-67053 A | 6/1978 |
| JP | 9-166182 A | 6/1997 |

OTHER PUBLICATIONS

"Italian Application Serial No. IT B020120359, Search Report dated Mar. 18, 2013", 7 pgs.

* cited by examiner

*Primary Examiner* — Marguerite McMahon
*Assistant Examiner* — Tea Holbrook
(74) *Attorney, Agent, or Firm* — Schwegman Lundberg & Woessner, P.A.

(57) ABSTRACT

An internal combustion engine having two cylinders, which are arranged in "V" configuration and accommodate respective pistons, and a first balancing body, which is fixed to a crankshaft at a first piston so that the first order reciprocating inertial forces of the first piston lie on a first straight line forming a first inclination angle which is not zero with the first cylinder; the combination of an angle between the cylinders with the first inclination angle is such that the first straight line on which the first order reciprocating inertial forces generated by the first piston lies is parallel to a second straight line on which the first order reciprocating inertial forces generated by the reciprocating motion of a second piston lie.

10 Claims, 9 Drawing Sheets

"V" CONFIGURATION ENGINE CYLINDERS AND CRANK WITH ANTIPHASE FIRST ORDER RECIPROCATING INERTIAL FORCES

PRIORITY CLAIM AND RELATED APPLICATIONS

This application claims the benefit of priority under 35 U.S.C. Section 119 to Italian Patent Application Serial No. BO2012A 000359, filed Jun. 28, 2012, which application is incorporated herein by reference in its entirety

TECHNICAL FIELD

The present invention relates to an internal combustion engine with "V" configuration of the cylinders.

BACKGROUND

The main vibrations of an internal combustion engine are not caused by the combustion of the mixture in the cylinders (even if the crankcase is particularly rigid) and are not even caused by the rotation of the crankshaft (which is balanced by means of specific counterweights or special shapes), but are determined by the reciprocating motion of the pistons which accelerate under the bias of the gases, slow down suddenly and pick up speed again reversing their direction of motion, i.e. are determined by the so-called reciprocating inertial forces. The piston causes the most violent shuddering (i.e. the maximum intensity of the reciprocating inertial forces) when the direction of motion is reversed (i.e. when its acceleration/deceleration is maximum), but reciprocating inertial forces displaying variable intensity over time with a sinusoidal law are present in all instants of motion.

Reciprocating inertial forces generate vibrations which are detrimental for the engine (because they can cause failure by fatigue over time) and are also annoying for vehicle occupants. In order to reduce such vibrations, the internal combustion engine must be balanced, i.e. by using balancing countershafts (also known as balancing shafts), which allow to reduce (compensate) the reciprocating inertial forces. However, the use of balancing countershafts gives rise to various drawbacks due to the weight and dimensions of the balancing countershafts, the weight and dimensions of the drive needed to turn the balancing countershafts and the greater weight of the engine crankcase which must also support the stress induced by the balancing countershafts (the balancing countershafts generate further reciprocating inertial forces which are transmitted to the engine crankcase and cancel out the reciprocating inertial forces of the pistons in the engine crankcase itself).

U.S. Pat. No. 4,517,933A1 describes an internal combustion engine with a "V" configuration of the cylinders, wherein the crankshaft is provided with balancing masses 31a, 31b and 31c to reduce the vibrations generated by the reciprocating motion of the pistons.

OVERVIEW

Examples of the present subject matter provide an internal combustion engine with "V" configuration of the cylinders, which is easy and cost-effective to make and free from the aforesaid drawbacks.

According to the present subject matter, an internal combustion engine with "V" configuration of the cylinders is provided as claimed in the accompanying claims.

BRIEF DESCRIPTION OF THE DRAWINGS

The present invention will now be described with reference to the accompanying drawings, which show a non-limitative embodiment thereof, in which.

DETAILED DESCRIPTION

Figure 1:
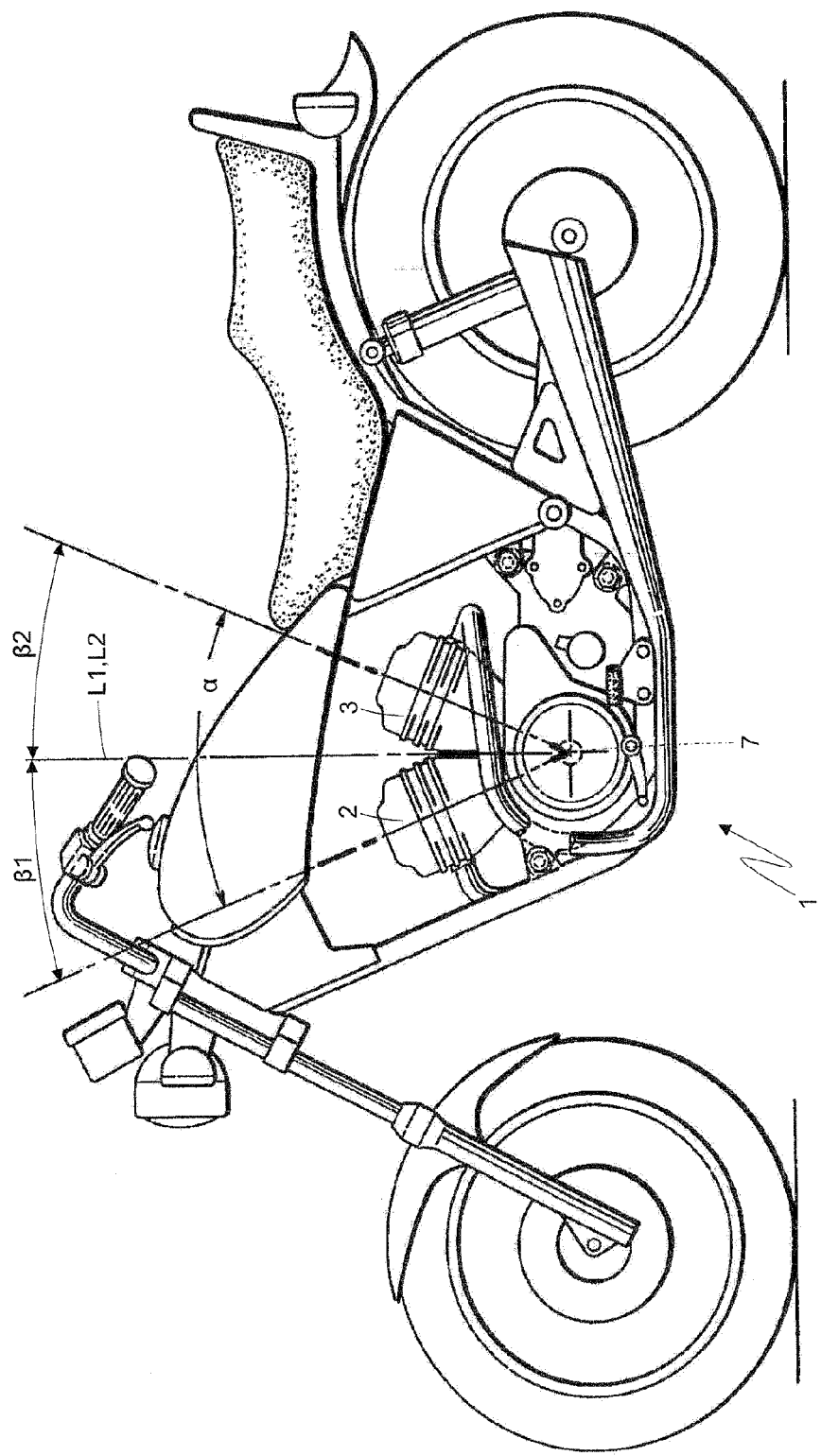
FIG. 1 is a diagrammatic view of a vehicle provided with an internal combustion engine made according to the present subject matter.
Figure 2:
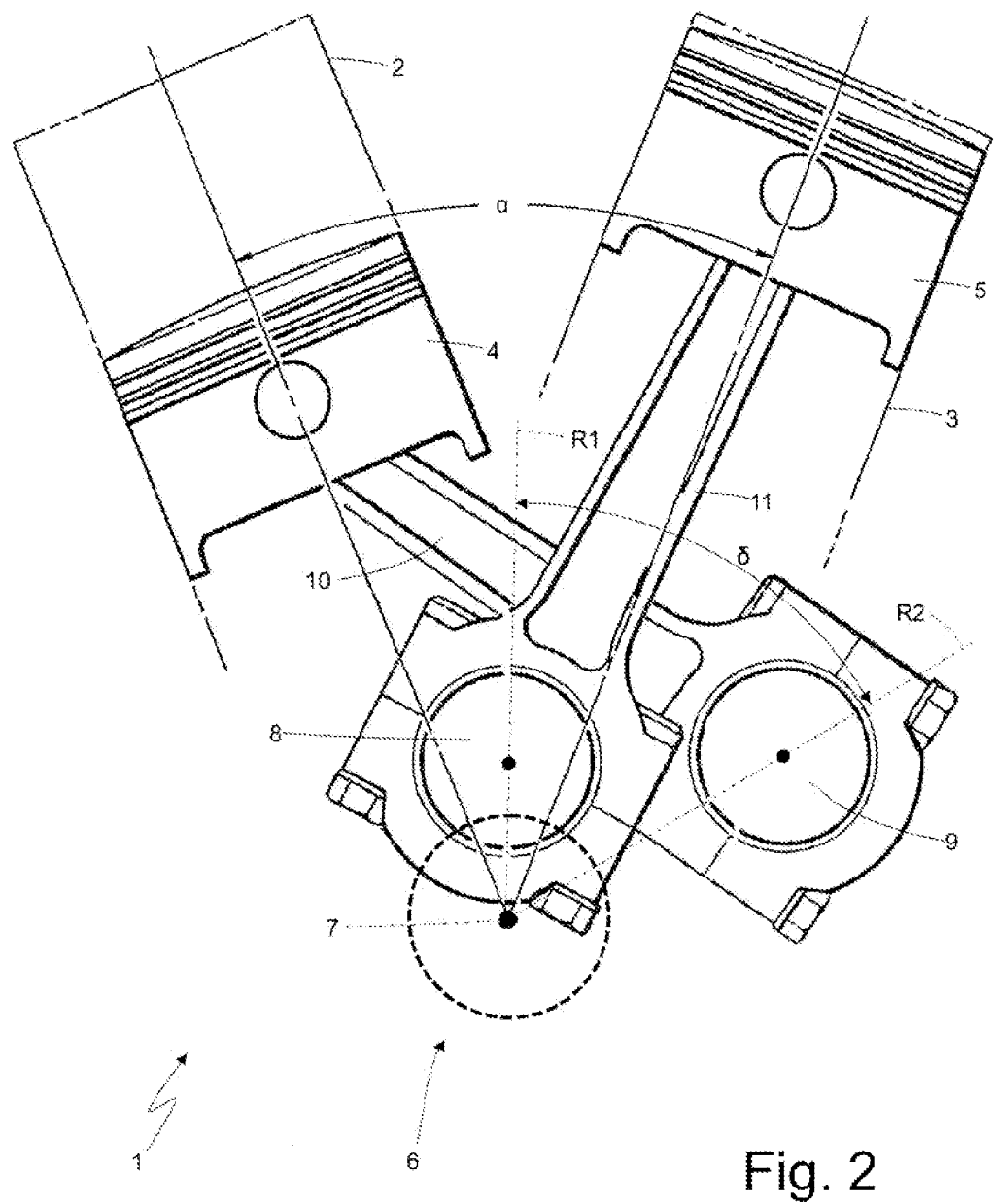
FIG. 2 is a diagrammatic view of the internal combustion engine in FIG. 1.

In FIGS. 1 and 2, reference numeral 1 indicates as a whole an internal combustion engine, which is provided with two cylinders 2 and 3 arranged in "V" configuration to form an angle α between cylinders which is not equal to zero (by way of example, in the embodiment shown in FIG. 1, the angle α between the cylinders is equal to 52°). A piston 4 which runs along the axis of the cylinder 2 is mounted so as to slide inside cylinder 2, while a piston 5 which runs along the axis of the cylinder 3 is mounted so as to slide in cylinder 3. The internal combustion engine 1 comprises a crankshaft 6, which is mounted so as to rotate around a rotation axis 7 and is provided with a crank shape, so as to have a corresponding crank 8, 9 for each piston 4, 5. The piston 4 is mechanically connected to the crank 8 of the crankshaft 6 by means of a connecting rod 10 which has one end hinged to the piston 4 and an opposite end hinged to the crank 8; similarly, the piston 5 is mechanically connected to the crank 9 of the crankshaft 6 by means of a connecting rod 11 which has one end hinged to the piston 5 and an opposite end hinged to the crank 9.

Figure 3:
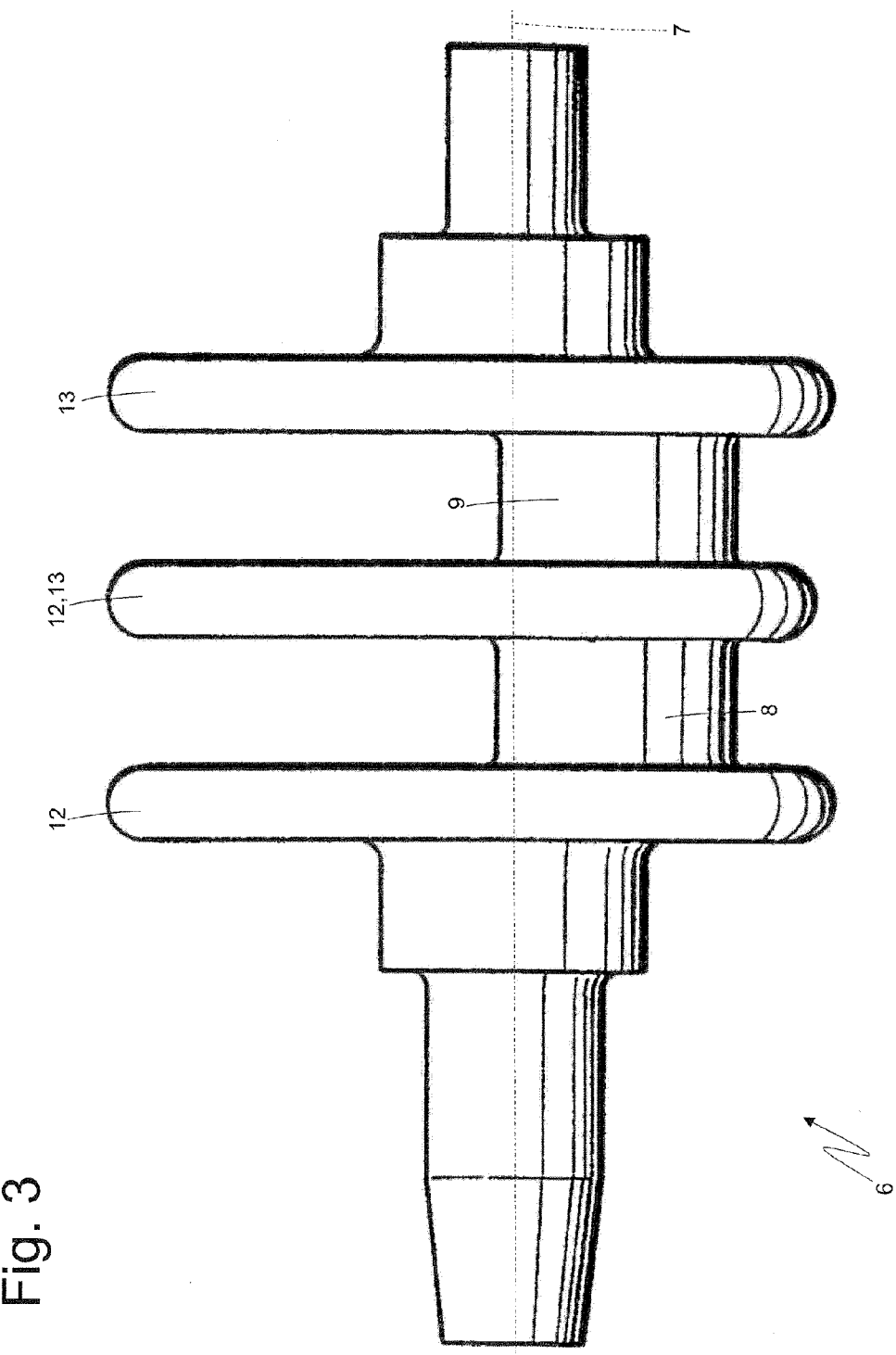
FIG. 3 is a side view of a crankshaft of the internal combustion engine in FIG. 2.

A balancing body 12 (shown in FIG. 3) is fixed to the crankshaft 6 at the piston 4, and in particular at the crank 8 of the piston 4. The balancing body 12 (as explained in greater detail below) is such that the first order reciprocating inertial forces generated by the reciprocating motion of the piston 4 lie along a straight line L1 (shown in FIG. 1) which forms an inclination angle β1 which is not equal to zero with the cylinder 2 (i.e. with the axis of the cylinder 2 along which the piston 4 moves with reciprocating motion). In the embodiment shown in FIG. 1, the inclination angle β1 is equal to +26° (i.e. 26° clockwise).

Similarly, a balancing body 13 (shown in FIG. 3) is fixed to the crankshaft 6 at the piston 5, and in particular at the crank 9 of the piston 5. The balancing body 13 (as explained in greater detail below) is such that the first order reciprocating inertial forces generated by the reciprocating motion of the piston 5 lie along a straight line L2 (shown in FIG. 1) which forms an inclination angle β2 which is not equal to zero with the cylinder 3 (i.e. with the axis of the cylinder 3 along which the piston 5 moves with reciprocating motion). In the embodiment shown in FIG. 1, the inclination angle β2 is equal to −26° (i.e. 26° counterclockwise).

The combination of the angle α between the cylinders and the two inclination angles β1 and β2 is such that the first straight line L1, on which the first order reciprocating inertial forces generated by the reciprocating motion of the first piston 4 lie, is parallel to a second straight line L2, on which the first order reciprocating inertial forces generated by the reciprocating motion of a second piston 5 lie. Indeed, the two cylinders 2 and 3 are distanced 52° apart (i.e. the angle α between the cylinders is equal to 52°), the straight line L1 is shifted clockwise (i.e. towards the cylinder 3) by 26° (i.e. the inclination angle β1 is equal to +26°) and the straight line L1 is moved counterclockwise (i.e. towards the cylinder 2) by 26° (i.e. the inclination angle β2 is equal to −26°); consequently, the two straight lines L1 and L2 are parallel to each other.

The crank angles of the two cylinders 2 and 3 are such that the first order reciprocating inertial forces generated by the reciprocating motion of the piston 4 and the first order reciprocating inertial forces generated by the reciprocating motion of the piston 5 are in phase opposition (e.g., antiphase); in this respect, it is worth noting that after having defined the angle α between the cylinders it is simple (i.e. by applying a simple geometric calculation) to establish the crank angles so that the first order reciprocating inertial forces generated by the reciprocating motion of the piston 4 and the first order reciprocating inertial forces generated by the reciprocating motion of the piston 5 are in phase opposition.

In this manner, the first order reciprocating inertial forces generated by the reciprocating motion of the two pistons 4 and 5 are parallel to each other (i.e. lie on two mutually parallel straight lines L1 and L2) and are also in phase opposition; consequently, the first order reciprocating inertial forces generating the reciprocating motion of the two pistons 4 and 5 always cancel each other out.

Figure 4:
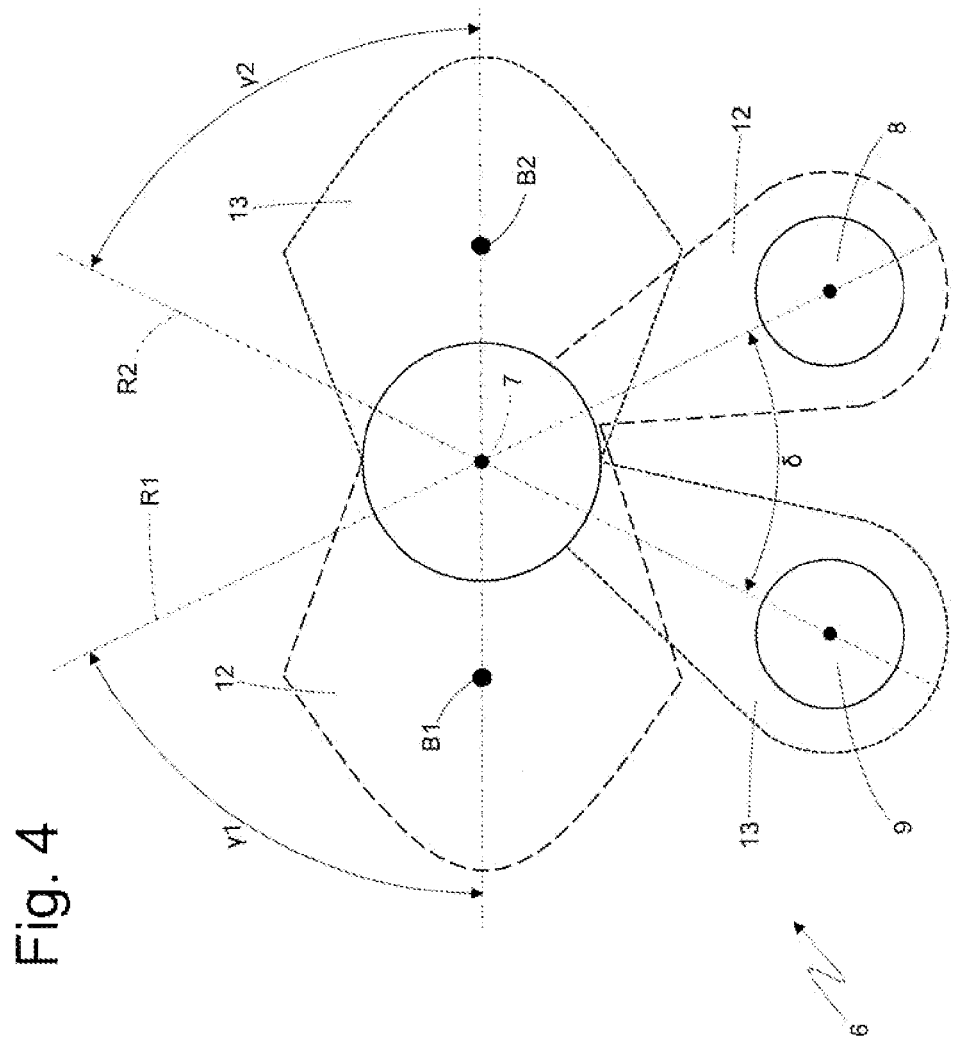
FIG. 4 is a cross section view of the crankshaft in FIG. 3.

In order to make that the first order reciprocating inertial forces generated by the reciprocating motion of a piston 4 or 5 lie on a straight line L1 or L2 forming an inclination angle β1 or β2 which is not zero with the cylinder 2 or 3, it is possible to shift the balancing body 12 or 13 out of phase with respect to the corresponding crank 8 or 9 (as shown in FIG. 4), i.e.

it is possible to arrange the balancing body 12 or 13 so that the line R1 (shown in FIG. 4) connecting the barycenter (i.e., the center of mass) B (e.g., B1 or B2) of the balancing body 12 or 13 to the rotation axis 7 of the crankshaft 6 forms a phase angle γ1 or γ2 that is not zero with the prolongation of the line R2 connecting the crank 8 or 9 of the piston 4 or 5 to the rotation axis 7. In other words, in a conventional internal combustion engine, the balancing body and the corresponding crank (i.e., the barycenter of the balancing body) are in perfect phase opposition along the prolongation of the line connecting the crank of the piston to the rotation axis of the crankshaft; instead, in the internal combustion engine 1 according to the present subject matter, the barycenter B of the balancing body 12 or 13 is not along the prolongation of the line R2 connecting the crank 8 or 9 of the piston 4 or 5 to the rotation axis 7, but is "shifted out of phase" by a phase angle γ1 or γ2 which is not zero with respect to the prolongation of the line R2 connecting the crank 8 or 9 of the piston 4 or 5 to the rotation axis 7.

It is worth noting that, as clearly shown in FIG. 4, the two lines R2 mutually form an angle δ identical to the angle α between cylinders 2 and 3 (e.g., an angle δ equal to 52° in the embodiment shown in the accompanying figures).

Furthermore, in order to make the first order reciprocating inertial forces generated by the reciprocating motion of a piston 4 or 5 lie along a straight line L1 or L2 forming an inclination angle β1 or β2 which is not zero with the cylinder 2 or 3, it is necessary to combine the phase angle γ1 or γ2 which is not zero with a particular mass value of the balancing body 12 or 13. According to an embodiment, the phase angles γ1 and γ2 are equal to ±64° (i.e. to 64° clockwise or counterclockwise), while the balancing body 12 or 13 has a mass equal to 43.8% of the equivalent mass which generates the reciprocating inertial forces of the piston 4 or 5 (i.e. of the entire mass of the piston 4 or 5, and of the part of the mass of the connecting rod 10 or 11). At this time, we are not aware of other phase angle γ1 or γ2 and balancing body 12 or 13 mass combinations (i.e. other than ±64° and 43.8% of the equivalent mass, respectively) which allow to make the first order reciprocating inertial forces lie along a straight line which is inclined by an inclination angle β1 or β2 which is not zero and not straight with respect to the corresponding cylinder 2 or 3 (i.e. with respect to the axis of the corresponding cylinder 2 or 3); however, we cannot exclude beforehand the existence of other phase angle γ1 or γ2 and balancing body mass 12 or 13 combinations which allow to make the first order reciprocating inertial forces lie along an inclination angle β1 or β2 which is not zero with respect to the corresponding cylinder 2 or 3 (i.e. with respect to the axis of the corresponding cylinder 2 or 3).

In order to better understand the present subject matter, the method used to modify the reciprocating inertial forces F generated by the reciprocating motion of a piston 4 or 5 as the position and mass of a balancing body 12 or 13 applied to the crankshaft 6 at the respective crank 10 or 11 varies is explained below with reference to FIGS. 3-7.

Figure 5:
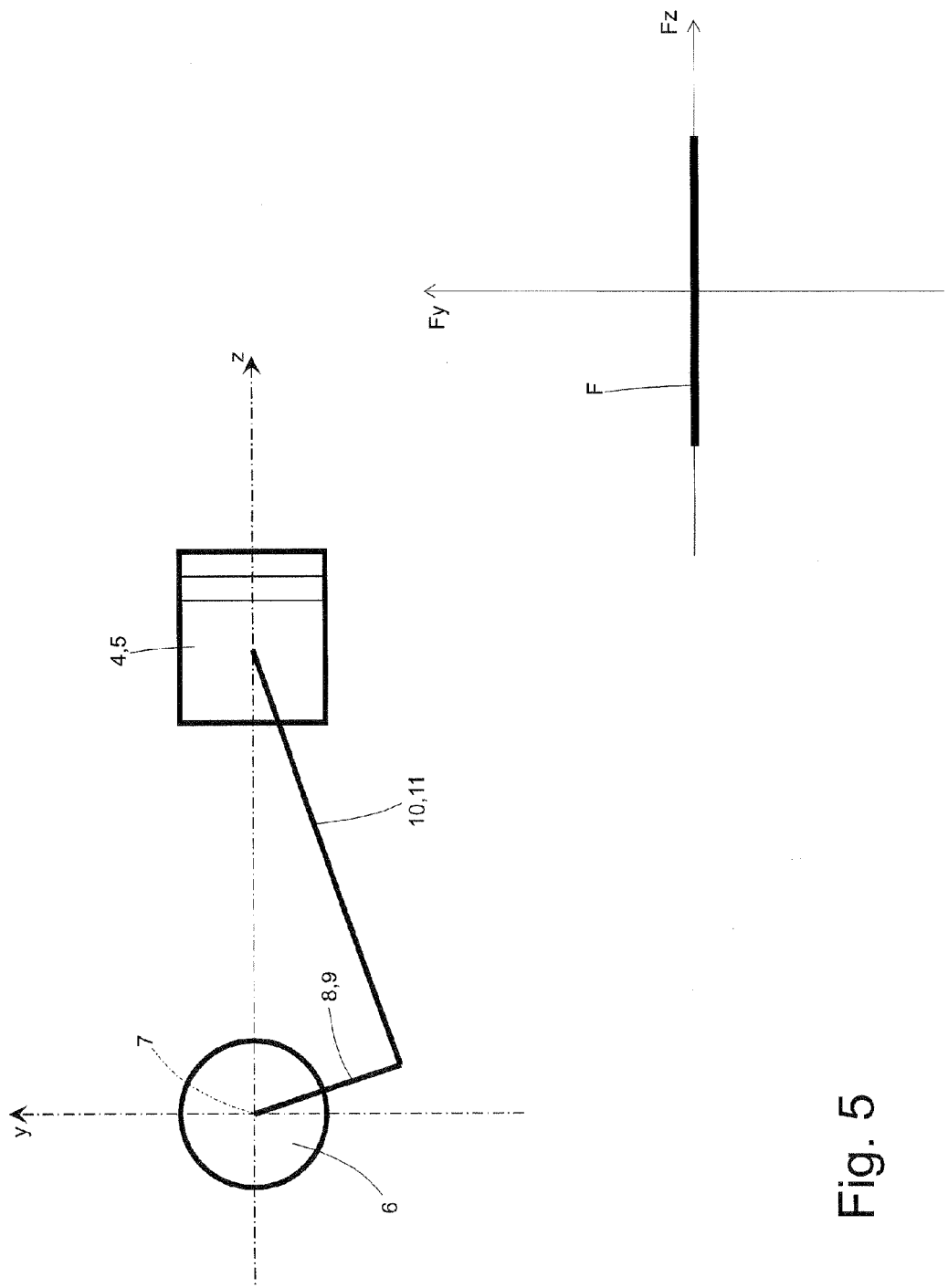
FIGS. 5-9 are a sequence of diagrammatic views which illustrate how the reciprocating inertial forces generated by the reciprocating motion of a piston are modified as the position and mass of a balancing body applied to the crankshaft varies.

As shown in FIG. 5, when the shaft 6 is free from the balancing bodies, the reciprocating inertial forces F generated by the reciprocating motion of the piston 4 or 5 lie on a straight line parallel to axis z (i.e. to the axis of the cylinder 2 or 3).

Figure 6:
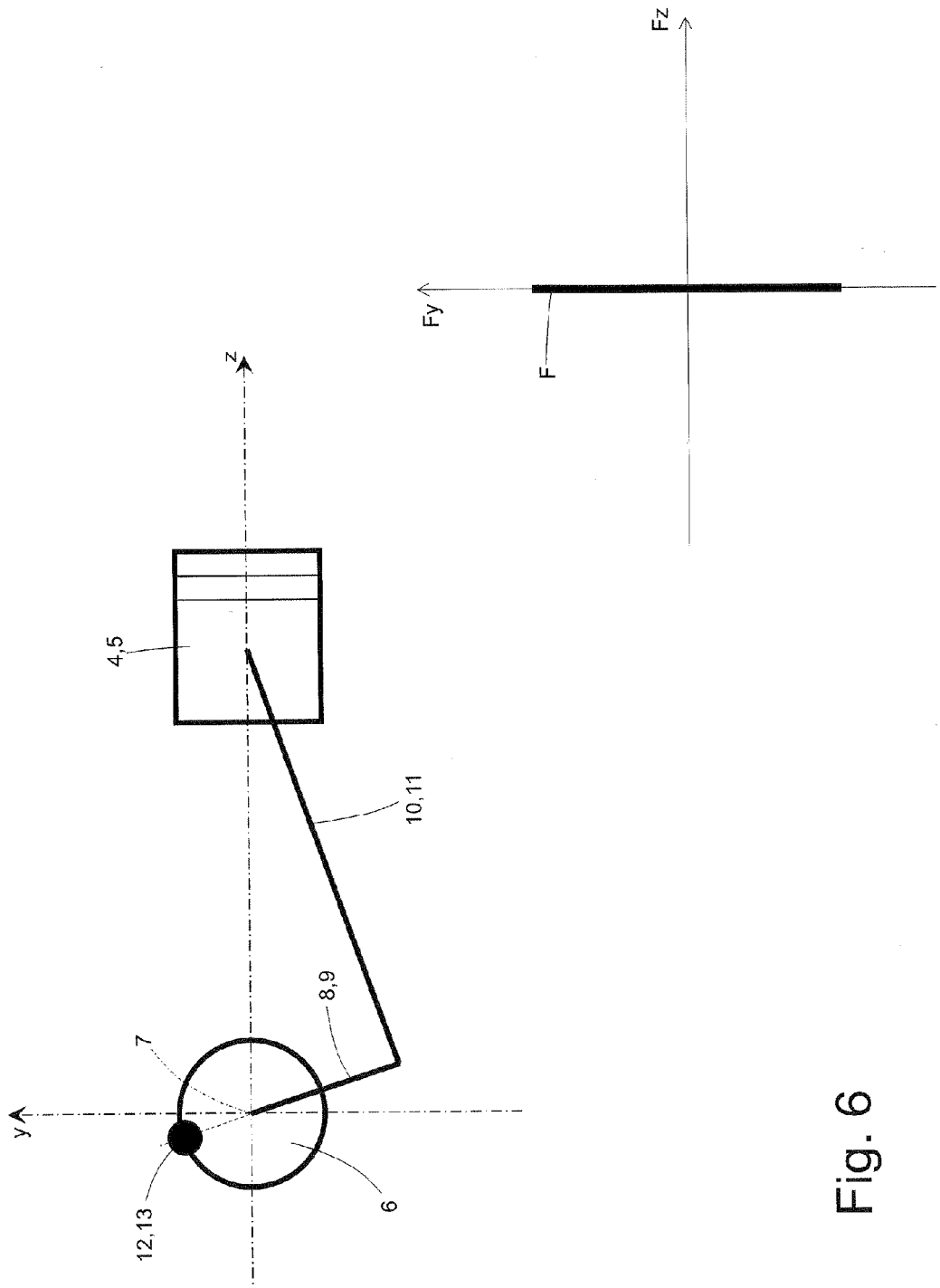

As shown in FIG. 6, when the shaft 6 comprises a balancing body 12 or 13 having a balancing mass equal to 100% of the balancing mass which generates the reciprocating inertial forces F in perfect phase opposition with the corresponding crank 8 or 9 (i.e. with a phase angle γ1 or γ2 which is not zero), the reciprocating inertial forces F generated by the reciprocating motion of the piston 4 or 5 lie on a line parallel to axis y (i.e. are turned by 90° with respect to the case shown in FIG. 4) which is perpendicular to axis z (i.e. to the axis of cylinder 2 or 3).

Figure 7:
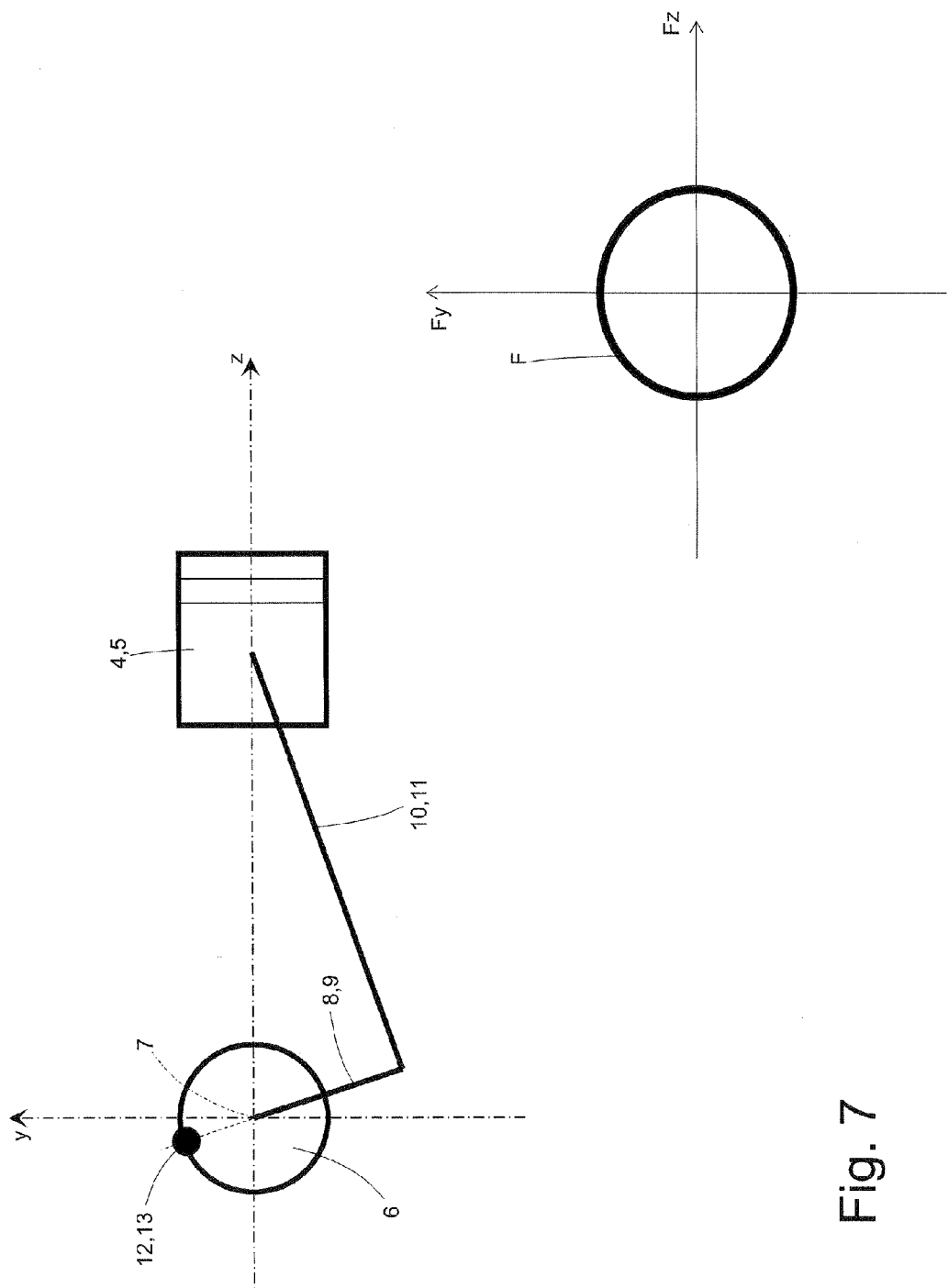
Figure 8:
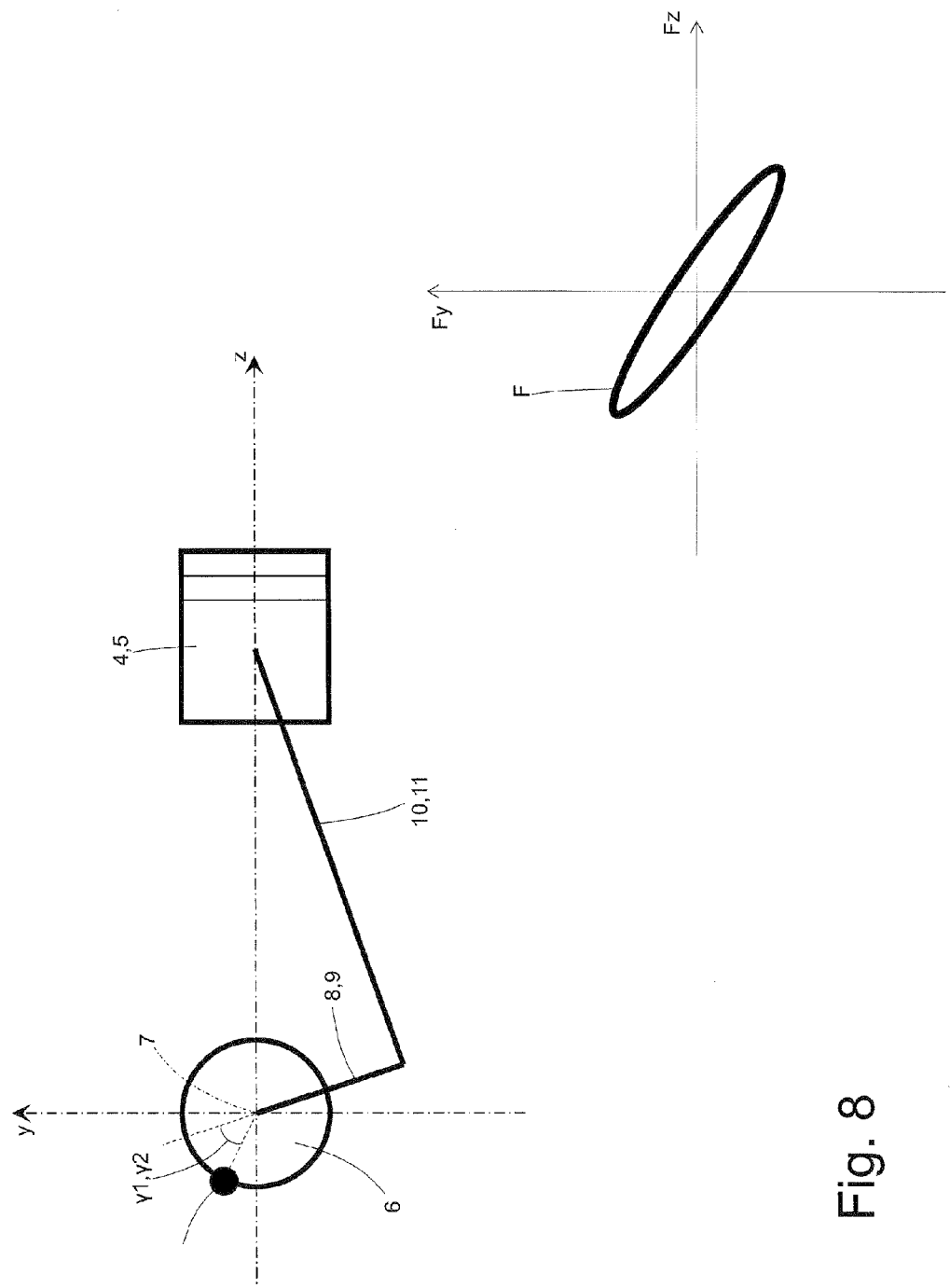

As shown in FIG. 7, when the shaft 6 comprises a balancing body 12 or 13 having a mass equal to 50% of the equivalent mass which generates the reciprocating inertial forces F arranged in perfect phase opposition with the corresponding crank 8 or 9 (i.e. with a phase angle γ1 or γ2 which is zero), the reciprocating inertial forces F generated by the reciprocating motion of the piston 4 or 5 lie on a circumference.

Figure 9:
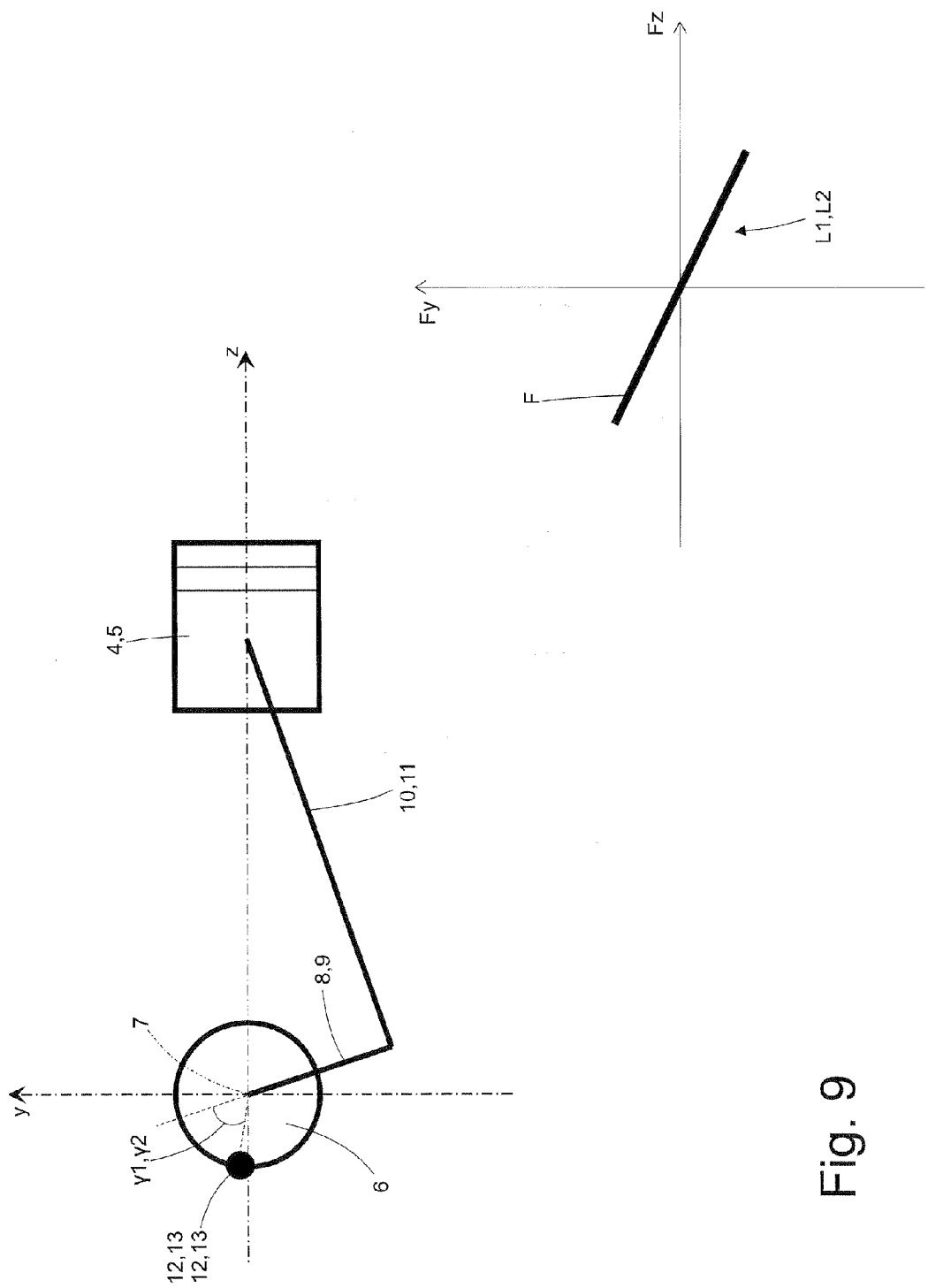

As shown in FIG. 9, when the shaft 6 comprises a balancing body 12 or 13 having a mass equal to 50% of the equivalent mass which generates the reciprocating inertial forces F arranged at a phase angle γ1 or γ2 of +45°, the reciprocating inertial forces F generated by the reciprocating motion of the piston 4 or 5 lie on an ellipsis the main axis of which is inclined by −34° with respect to axis z (i.e. with respect to the axis of cylinder 2 or 3).

As shown in FIG. 9, when the shaft 6 comprises a balancing body 12 or 13 having a mass equal to 43.8% of the equivalent mass which generates the reciprocating inertial forces F arranged at a phase angle γ1 or γ2 of +64°, the reciprocating inertial forces F generated by the reciprocating motion of the piston 4 or 5 lie on a straight line L1 or L2 which is inclined by −26° with respect to axis z. As previously mentioned, at this time, this is the only known balancing body 12 or 13 mass and phase angle γ1 or γ2 combination which allows to make the reciprocating inertial forces F generated by the reciprocating motion of the piston 4 or 5 lie on a straight line L1 or L2 which is inclined by −26° with respect to the axis z (i.e. with respect to the axis of the cylinder 2 or 3).

In the embodiment shown in the accompanying figures, the angle α between the cylinders is equal to 52° and both pistons 4 and 5 are coupled to balancing masses 12 and 13 which are shifted out of phase with respect to the corresponding cranks 8 and 9 (i.e. are arranged with phase angles γ1 and γ2 which are not zero with respect to the corresponding cranks 8 and 9).

According to alterative embodiments (not shown and perfectly equivalent), the angle α between the cylinders can be modified by reversing either only one of the two phase angles γ1 and γ2 or both phase angles γ1 and γ2 which are not zero; indeed, as mentioned above, the angle α between the cylinders must always be such to allow the parallelism between the two straight lines L1 and L2, and by varying the phase angles γ1 and γ2 (i.e. by changing the sign of the phase angles γ1 and γ2) the inclination angles β1 and β2 which determine the position of the straight lines L1 and L2 vary as a consequence.

According to further embodiments, only the piston 4 is coupled to the balancing body 12, which is shifted out of phase with respect to the corresponding crank 8 (i.e. which is arranged by a phase angle γ1 which is not zero with respect to the corresponding crank 8), while the balancing body 13 coupled to the piston 5 is not present.

By varying the phase angles γ1 and γ2 by using the balancing body 13 or not, the angle α between the cylinders may assume the following values: 26°, 52° (as shown in the accompanying figures), 64°, 116°, 128°, 154°; such a limitation of the angle α between the cylinders is, as mentioned above, determined by the fact that the parallelism must always be guaranteed between the two straight lines L1 and L2.

In the embodiment described above, the internal combustion engine 1 comprises only two cylinders 2 and 3 in "V" configuration; according to other embodiments (not shown and perfectly equivalent), the internal combustion engine 1 comprises a higher number of cylinders 2 and 3 in "V" configuration, and in particular a higher number of pairs of cylinders 2 and 3 in "V" configuration (e.g. four, six, eight or ten cylinders 2 and 3).

The internal combustion engine 1 described above has many advantages, because it allows to perfectly balance (i.e. to perfectly cancel out) the first order reciprocating inertial forces (i.e. which have the same frequency as the rotation of the crankshaft 6) generated by the reciprocating motion of the pistons 4 and 5 without using balancing countershafts but only by working on the balancing masses 12 and 13 added to the crankshaft 6.

In the internal combustion engine 1 described above, the second order reciprocating inertial forces (i.e. those which have a frequency double that of the rotation frequency of the crankshaft 6) are not balanced (but only partially reduced); however, the second order reciprocating inertial forces have a modulus which is approximately one third of the first order reciprocating inertial forces, and thus the negative effect is much lower than that of the first order reciprocating inertial forces.

The invention claimed is:

1. An internal combustion engine comprising:
    at least two cylinders each having a center axis, which are arranged in a "V" to form an angle (α) between the center axes of the cylinders the angle (α) being not equal to zero;
    two pistons, each of which is mounted so as to slide inside a corresponding cylinder;
    a crankshaft, which is mounted so as to rotate around a rotation axis and is provided with a crank shape, so as to present, for each piston, a corresponding crank;
    two connecting rods, each of which presents an end that is hinged to a corresponding piston and an opposite end that is hinged to the corresponding crank; and
    a first balancing body, which is fixed to the crankshaft in correspondence to a first piston;
    wherein the arrangement of the first balancing body is such that the first order reciprocating inertial forces generated by the reciprocating motion of the first piston lie along a first straight line (L1) forming a first inclination angle (β1) with the central axis of the first cylinder, the first inclination angle (β1) being not equal to zero;
    wherein the combination of the angle (α) between the cylinders with the first inclination angle (β1) is such that the first straight line (L1), on which the first order reciprocating inertial forces generated by the reciprocating motion of the first piston lie, is parallel to a second straight line (L2), on which the first order reciprocating inertial forces generated by the reciprocating motion of a second piston lie;
    wherein the crank angles of the two cylinders are such that the first order reciprocating inertial forces generated by the reciprocating motion of the first piston are in phase opposition with respect to the first order reciprocating inertial forces generated by the reciprocating motion of the second piston;
    wherein a third straight line connecting the barycenter (β1) of the first balancing body to the rotation axis of the crankshaft forms a first phase angle (γ1) with the prolongation of a fourth straight line (R1) connecting the crank of the first piston to the rotation axis of the crankshaft, the first phase angle (γ1) being not equal to zero.

2. The internal combustion engine according to claim 1, wherein the first phase angle (γ1) is equal to ±64°.

3. The internal combustion engine according to claim 1, wherein the first balancing body presents a mass that is equal to 43.8% of the equivalent mass generating the reciprocating inertial forces of the first piston.

4. The internal combustion engine according to claim 1 and comprising a second balancing body, which is fixed to the crankshaft in correspondence to the second piston and is arranged such that the second straight line (L2), on which the first order reciprocating inertial forces generated by the reciprocating motion of a second piston lie, forms a second inclination angle (β2) with the center axis with the second cylinder, the second inclination angle (β2) being not equal to zero.

5. The internal combustion engine according to claim 4, wherein a fifth straight line connecting the barycenter (B2) of the second balancing body to the rotation axis of the crankshaft forms a second phase angle (γ2) with the prolongation of a sixth straight line (R2) connecting the crank of the second piston to the rotation axis of the crankshaft, the second phase angle (γ2) being not equal to zero.

6. The internal combustion engine according to claim 5, wherein the second phase angle (γ2) is equal to ±64°.

7. The internal combustion engine according to claim 5, wherein the second balancing body presents a mass that is equal to 43.8% of the equivalent mass generating the reciprocating inertial forces of the second piston.

8. The internal combustion engine according to claim 5, wherein the fourth straight line (R1) connecting the crank of the first piston to the rotation axis of the crankshaft forms an angle (δ) identical to the angle (α) between the two cylinders with a sixth straight line (R2) connecting the crank of the second piston to the rotation axis forms of the crankshaft.

9. The internal combustion engine according to claim 1, wherein the second piston is not coupled to any balancing body.

10. The internal combustion engine according to claim 1, wherein the angle (α) between the cylinders is selected within the following set: 26°, 52°, 64°, 116°, 128°, 154°.

* * * * *